United States Patent [19]

Dreiding

[11] 4,020,566

[45] May 3, 1977

[54] MOLECULAR MODELS

[76] Inventor: André Dreiding, Langackerstrasse 43, Herrliberg, Switzerland

[22] Filed: Mar. 3, 1975

[21] Appl. No.: 555,056

[30] Foreign Application Priority Data

Mar. 5, 1974 Switzerland .................... 3037/74

[52] U.S. Cl. .................... 35/18 A; 46/25; 46/28

[51] Int. Cl.² .................. G09B 23/26; A63H 33/08

[58] Field of Search .......... 35/18 A, 34, 77; 46/23, 46/25, 27, 28, 29; 285/65, 67; 339/47 R, 47 C, 48; 403/146, 166

[56] References Cited

UNITED STATES PATENTS

| 1,851,159 | 3/1932 | Dodge | 35/18 A |
|---|---|---|---|
| 2,799,970 | 7/1957 | Baggott | 403/166 X |
| 3,230,643 | 1/1966 | Mathus | 35/18 A |
| 3,373,397 | 3/1968 | Renshaw | 339/47 C |
| 3,492,756 | 2/1970 | Stubbmann | 35/77 UX |
| 3,509,642 | 5/1970 | Brumlik | 35/18 A |

FOREIGN PATENTS OR APPLICATIONS

| 26,188 | 11/1953 | Finland | 35/18 A |
|---|---|---|---|
| 1,533,186 | 6/1968 | France | 339/47 R |
| 942,506 | 11/1963 | United Kingdom | 339/47 R |

Primary Examiner—Harland S. Skogquist
Attorney, Agent, or Firm—Woodhams, Blanchard and Flynn

[57] ABSTRACT

A set of structural elements for making stereochemical models of molecules formed between polyvalent atoms. Each structural element has at least two connector arms representing the valences of an atom. An end portion of each arm is connected to an end portion of another connector arm, and the other end portion of each arm includes means for manually coupling and uncoupling the arm in an axial direction to the free end portion of another connector arm of the same element or to a connector arm of a further element. Said means for each arm is of the same configuration so that coupling can be effected without auxiliary means.

21 Claims, 19 Drawing Figures

MOLECULAR MODELS

The invention relates to a set of structural elements for the making of stereochemical models of molecular bands between polyvalent atoms in atomic unions molecules, molecular aggregates or chemical compounds, which structural elements each have at least two connector arms representing the valences of at least one atom, each of these arms having opposite inner and outer end portions and being connected at its inner end portion with a corresponding end portion of at least one other of the connector arms of the same structural element, the outer end porton of each connector arm comprising means which, for the representation of a bond, allow the connector arm to be coupled coaxially with the outer end portion of another one of the connector arms of the same structural element or of another one of the structural elements in such a way that the coupling and uncoupling can be carried out by hand and that connected structural elements do not fall apart or lose their structure unintendedly, for example under the influence of their own weight.

In the known structural elements of the kind mentioned the free, or outer ends of connector arms may be coupled together pairwise in that in each instance one of the connector arms to be coupled is constructed at its free end as a plug-in pin and the other connector arm is formed at its free end as a plug-in socket, into which the plug-in pin can be inserted and fitted. In the simplest instance the connector arms are designed partly as rods and the other as tubes, so that the rods are insertable into the tubes until they reach an abutment, at which position they are held by friction or by a snap-action locking device. It is evident that in each instance always only an end of an arm shaped as a plug-in pin and an end of an arm designed as a plug-in socket may be coupled together, and that it is not possible to couple together two connector arms with ends designed as plug-in pins or two connector arms with ends designed as plug-in sockets. As a consequence of this, working with the described known structural elements has two drawbacks: the first drawback is encountered when building stereochemical models, which is made substantially more difficult inasmuch as it is always necessary to select connector arms with matching couplings to make a given connection. The second drawback consists in that the usability of the structural elements for the model representation of chemical reactions, i.e. of the changing of bonds between atoms, is considerably reduced inasmuch as one cannot select any pair of connectors for recoupling after previously coupled pairs have been disconnected, whereas there are many reactions for which such a representation is required.

The first mentioned drawback does not occur with other known building elements of the type mentioned herein-before, in which all the connector arms of all structural elements are designed as plug-in pins at their free ends. To make the coupling of the connector arms, however, additional coupling sleeves are then necessary, into the opposite ends of which the pin-shaped free ends of the connector arms to be coupled together can be inserted from the two opposite sides. In this case, therefore, it is necessary each time, on connecting two connector arms, to have recourse a separate unit, a coupling sleeve, whereby the operation with these structural elements is again disadvantageously made more complicated and time consuming. The second drawback mentioned in the previous paragraph, on the other hand, is not avoided with these known structural elements since each time a connection is broken two unequal coupling members, namely a plug-in pin and a plug-in socket, are set free with the disadvantageous consequence mentioned in the previous paragraph. It is therefore necessary to completely remove the separate coupling sleeves from all pairs of structural elements uncoupled, in order to provide the possibility of universal recoupling, each recoupling requiring the reintroduction of a separate coupling sleeve with two coupling operations.

Further known structural elements for the construction of stereochemical models of molecules have each the shape of a body, for example of a ball, such that instead of having connector arms that can be joined together pairwise, the arms each representing a valence of an atom, there are holes in these bodies, functioning as plug-in sockets. In this case it is necessary to make use of connecting rods, the opposite ends of which are designed as plug-in pins intended to be inserted into holes of the bodies. It is evident that both the second and the third previously mentioned drawbacks also apply here.

A further drawback of the two last described types of models is that a greater number of individual parts must be supplied, namely units representing atoms or groups of atoms as well as separate connector units.

It is the object of the present invention to avoid all the drawbacks mentioned hereinabove. This object is achieved according to the invention substantially in that all the free or outer ends of the connector arms have identically designed coupling devices, each of which can be coupled with any equally designed coupling device of each one of the other connector arms without any auxiliary means.

In an appropriate embodiment every coupling arrangement may have both a projecting coupling portion, e.g. in the form of a plug-in pin, and a coupling recess, for example in the form of a plug-in socket, in such a manner that, on coupling any two of the connector arms, the projecting coupling portions of these two connector arms are able to be brought into coupling connection with the coupling sockets of these two connector arms simultaneously. Advantageously, the plug-in pins and the plug-in sockets may each have a semi-circular section.

In an another embodiment suited to the purpose, each coupling device may have at least one permanent magnet with North pole and South pole surfaces lying at the free end, in such a manner that on coupling any two of the connector arms the North pole surfaces of the magnets of these two connector arms may be brought simultaneously in contact with the South pole surfaces of these two connector arms.

In a further embodiment, the coupling device of each connector arm may have additionally means for positive securing by locking through their shape or by pressure locking of the connection between the coupling devices of any two connector arms. For this purpose, each coupling device may be provided with at least one projection transverse to the longitudinal axis of the end section of the appropriate connector arm, and with at least one corresponding notch, the projection and the notch being matched one with the other in such a manner that on coupling any two of the connector arms the projections of the coupling devices of said two connector arms are both engageable into the notches of the same two coupling devices.

Further features of the invention as well as details and advantages of appropriate methods of execution of the subject of the invention will be found in the claims, the description now following and the relevant drawings, in which the invention is described or illustrated purely for the sake of example.

Figures 1, 2, 3:
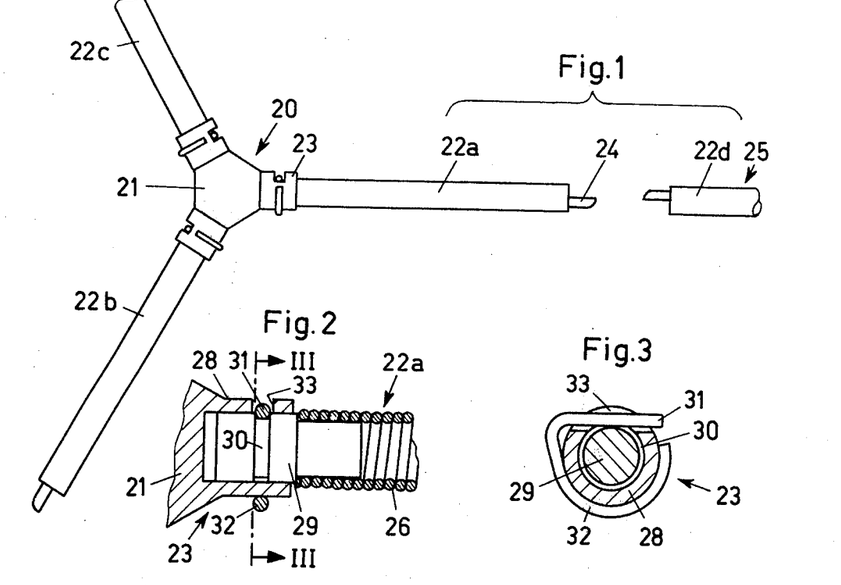
FIG. 1 shows a building element with three connector arms extending star-wise from a central portion, as well as a portion of a connector arm of another building element.
FIG. 2 represents on a larger scale a connection point between the central portion and one of the connector arms in section along the longitudinal axis of the relevant connector arm.
FIG. 3 is a cross-section along line III—III in FIG. 2.

According to FIG. 1, a buliding element 20 for the construction of stereochemical molecular models has a central part 21 which represents an atom, as well as three connector arms 22a, 22b and 22c representing the valences of the atom. Each of these connector arms is connected at one of its ends by means of a connection device 23 with the central part 21. The opposite end of each connector arm 22a, 22b and 22c is free and has a coupling device 24 which enables the relevant connector arm to be coupled co-axially with a suitable coupling device of another connector arm 22d, in order thereby to represent a chemical bond. The said other connector arm 22d is usually a component part of a further structural element, but if the need arises it may also be a connector arm of the same structural element.

Figure 4:
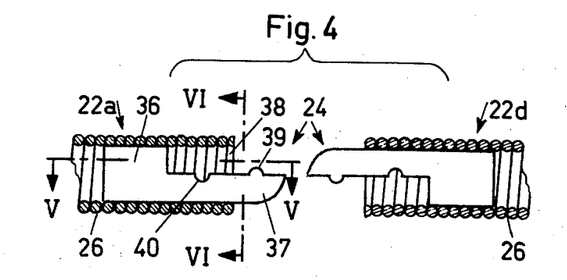
FIG. 4 shows in longitudinal section the free end portions, co-axially connectable together, of two connector arms of the structural elements according to FIG. 1.
Figure 5:
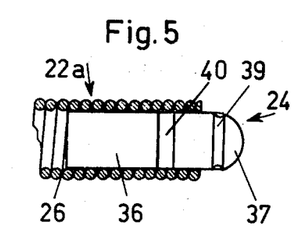
FIG. 5 is a section along line V—V of FIG. 4.

Each connector arm 22a, 22b, 22c or 22d is generally formed of a coil spring 26 with close lying windings, as FIGS. 2, 4 and 5 show. As a result of this construction the connector arm is resiliently flexible, and in the unloaded state it always extends along a straight line. Instead of the coil spring 26, however, an elastically flexible piece of tubing or a corresponding rod of plastic or similar material could be provided just as well.

The connection devices 23 have according to FIGS. 2 and 3 each on the central portion a fixedly mounted guiding sleeve 28 into which the end portion of a connecting pin 29 is rotatably inserted. The other end section of the pin 29 engages into the connector arm 22a, 22b or 22c formed by the coil spring 26 and is firmly connected with this, for example by glueing. The end portion of the pin 29 engaged in the guiding sleeve 28 has a circumferential groove 30, into which a sprung arm 31 of a hoop 32 made of spring wire engages, which hoop is laid around the guiding sleeve 28. The guiding sleeve 28 has a transversally running slot 33 which permits the sprung arm 31 to have access to the circumferential groove 30 of the pin 29. By means of the hoop 32, and in particular of its arm 31, and in cooperation with the circumferential groove 30, the pin 29 is secured against axial movement in respect of the guiding sleeve 28, without thereby the rotatability of the pin 29 in the guiding sleeve 28 being hindered. Thus the entire connector arm 22a, 22b or 22c is rotatably connected about its longitudinal axis with the central portion 21.

Figure 6:
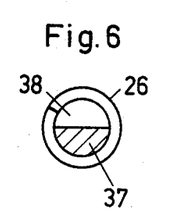
FIG. 6 is a section along line VI—VI in FIG. 4.

The coupling devices 24 which are each available at the free end of the connector arms 22a, 22b, 22c and 22d, all have the same construction which may be seen from FIGS. 4 to 6. In the free end portion of the coil spring 26 an insert piece 36 is fitted and firmly joined with the coil spring, e.g. by glueing. The insert 36 has a portion formed as a plug-in pin 37 and leaves inside the end portion of the coil spring 26 a recess 38 free, which acts as a plug-in socket. The longitudinal direction of the plug-in pin 37 and of the plug-in socket 38 extends parallel with the longitudinal axis of the relevant connector arm 22a, 22b, 22c or 22d. The cross-sections of the plug-in pin 37 and of the plug-in socket 38 are semi-circular and are completed as regards their shape, size and arrangement as a circular area, as may be seen clearly in FIG. 6. The plug-in pin 37 projects from the free end of the coil spring 26, as shown in FIGS. 4 and 5, so that is may be brought in coupling engagement with the plug-in socket 38 of the coupling device of one of the other connector arms. It will be seen that on coupling two connector arms, e.g. 22a and 22d, the plug-in pins 37 of the coupling devices 24 of these two connector arms are simultaneously able to be brought in engagement with the coupling recesses 38. In other words, this means that the plug-in pin 37 of the coupling device of one connector arm 22a may be introduced into the plug-in socket 38 of the coupling device of the second connector arm 22d, and at the same time also the plug-in pin of the coupling device of the second connector arm 22d is inserted into the plug-in socket 38 of the coupling device of the first connector arm 22a.

To secure the coupling engagement of the coupling devices 24 of two connector arms, e.g. and 22a and 22d, against unintentional release, each plug-in pin 37 is provided, according to FIGS. 4 and 5, with a projection 39, extending transverse to the plug-in direction, and in the form of a rib, and also with a corresponding notching 40 in the form of a groove, whereby the arrangement of the projection 39 and of the notch 40 is such that on coupling two connector arms, e.g. 22a and 22d, the projection 39 of the coupling device 24 of the first connector arm 22a engages into the notch 40 of the coupling device of the second connector arm 22d, and at the same time also the projection 39 of the coupling device of the second connector arm 22d engages into the notch 40 of the coupling device of the first connector arm 22a. The plug-in pins 37 are, in spite of the projections 39, insertable into the plug-in sockets 38, as the windings of the coil spring 26 which partly adjoin the plug-in sockets are able to yield resiliently and may be spread out a little elastically. As a result of the influence of the elasticity of the spring windings, in the coupled state, the projections 39 are held in engagement in the associated notches 40. The coupling and uncoupling of two connector arms may be carried out manually without auxiliary means and without excessive application of force.

All the coupling devices 24 on all free ends of the connector arms of all the structural elements belonging to a set for the building of stereochemical models are constructed similarly to one another. It is therefore possible to couple co-axially together any two free ends of connector arms of the same structural element or of different structural elements, as a result of which the building of stereochemical models are especially also the carrying-out of recombinations, i.e. the separation of a few connector pairs and the renewed coupling together in other pairings, for the representation of chemical changes and reactions, are considerably facilitated. As the connector arms, e.g. 22a, 22b and 22c, are each rotatably connected by means of the connection device 23 with the central portion 21, a certain mobility of the connector arms not directly coupled together is ensured inside a molecular model constructed of two or more building elements 20, 25, as a result of which again the representation of certain molecular structures or chemical conversions is facilitated or indeed made possible for the first time. This is of particular significance with the so-called "valence-tautomeric" or "pericyclic" reactions which — mostly in carbon systems — unfold stereo-specifically according to the rules of "parity" or "orbital symmetry" known to the specialist. It is clear that the individual building elements do not need to have in every case three connector arms 22a, 22b and 22c extending from one central portion 21. The number and arrangement of the connector arms, i.e. their three-dimensional configuration, is governed by the atom or possibly atom complex to be represented by the relevant building element. Also, the number of individual structural elements in a full set may be as desired. Usually, inside the set structural elements of different types are available, whose free connector arm ends, however, all have similarly formed coupling devices, which are able to be coupled together in any desired pairing.

In the field of the actual molecule, the rotational movement of the linkage between atom pairs made possible by the connection devices 23 is subject to certain limitations in the sense that specific rotational positions preferably arise and other rotational positions are practically excluded, according to the three-dimensional configuration of the bonds of the atoms joined together. In order to take this fact into account as far as possible when constructing stereochemical models, in the alternative embodiments shown in FIGS. 3A and 3B discontinuously-operating mechanical inhibitors have been incorporated into the pivot parts formed by the connection device 23.

Figure 3A:
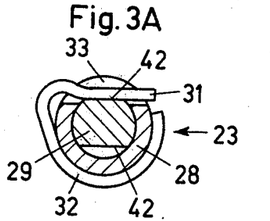
FIGS. 3A and 3B are representations of alternative embodiments similar to FIG. 3.

According to FIG. 3A the connection pin 29 has, instead of the evenly extending circumferential groove 30 (FIG. 3) two flat portions 42 lying diametrically opposite each other which, in collaboration with the sprung arm 31 of the spring hoop 32, effect that the relevant connector arm, e.g. 22a, has two preferred rotational positions staggered one at 180° to the other. These two preferred rotational positions are aligned on the spatial arrangement of the other two connector arms 22b and 22c of the relevant building element 20.

Figure 3B:
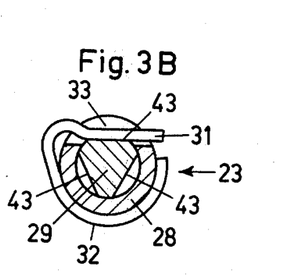

According to FIG. 3B the connection pin 29 is provided, instead of with the evenly extending circumferential groove 30 (FIG. 3) with three evenly arranged flats 43 which, in conjunction with the sprung arm 31 of the spring hoop 32, effect that the relevant connector arm has three preferred rotational positions staggered one at 120° to the other. This arrangement is e.g. appropriate for one structural element which has four connector arms pointing to the corners of a tetrahedron, and represents a carbon atom.

Figures 7, 8:
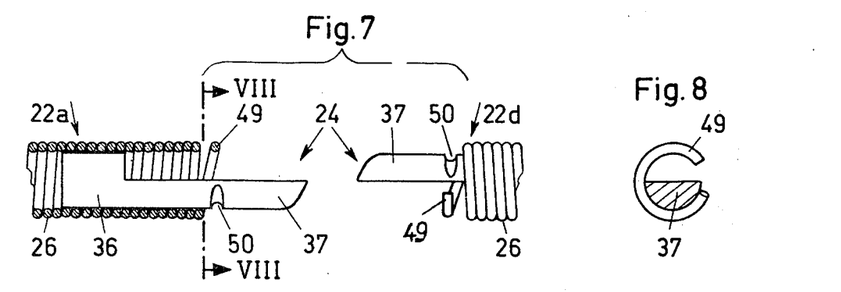
FIG. 7 shows another embodiment of two axially jointly connectable free end portions of two connector arms, one end portion being represented in longitudinal section, and the other in elevation.
FIG. 8 is a section along line VIII—VIII of FIG. 7.

The coupling devices 24 formed similar one with the other may take different forms, as shown in the following examples. The embodiment according to FIGS. 7 and 8 is differentiated from that according to FIG. 4 to 6 purely through another conformation of the means for securing the coupling connection against unintentional release. The plug-in pin 37 has on its outwardly-facing surface a groove-shaped notching 50, and the outermost winding 49 of the coil spring 26 constituting the connector arm, e.g. 22a is to some extent spread open, so that it can serve as a resilient securing element for engagement into the notching 50 of the plug-in pin 37 of a second connector arm 22d. On the assembling together of the coupling devices of two connector arms 22a and 22d the outermost spring winding 49 of the first connector arm 22a engages automatically into the notching 50 of the plug-in pin 37 of the second connector arm 22d, while at the same time the spring winding 49 of the second connector arm 22d engages in the notching 50 of the plug-in pin 37 of the first connector arm.

Figure 9:
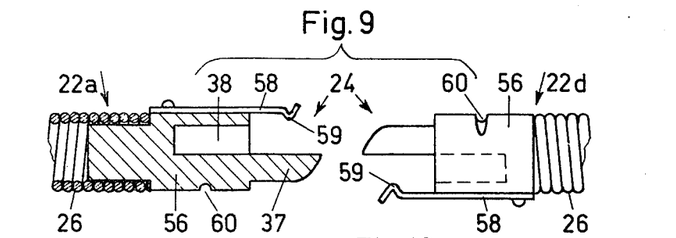
FIG. 9 again represents another embodiment of two axially jointly connectable free end portions of two connector arms, one end portion being represented in longitudinal section, and the other in elevation.

In the form of embodiment according to FIG. 9 each coupling device 24 has a coupling piece 56 fixed on the free end of the relevant connector arm 22a or 22d, on which both a projecting plug-in pin 37 and a plug-in socket 38 are formed. The coupling piece 56 has on its outer side a leaf spring 58, the free end portion of which is formed as an engagement member 59. The outer side of the coupling piece 56 lying opposite the leaf spring 58 is provided with a notching 60. On the assembling together of two of the two coupling devices the engagement members 59 of these two coupling devices engage simultaneously into the notchings 60 of these two coupling devices, in order thereby to prevent an undesired release of the coupling connection.

Figure 10:
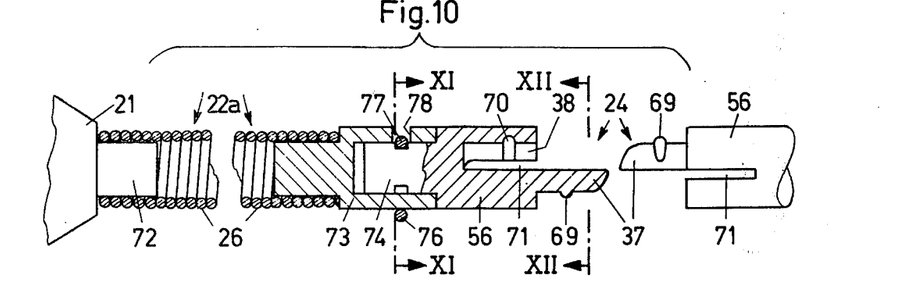
FIG. 10 shows a further embodiment of two jointly connectable connector arms, partly in elevation and partly in longitudinal section.
Figure 12:
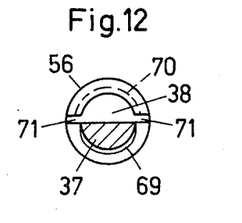
FIG. 12 is a cross-section along line XII—XII of FIG. 10.

According to FIGS. 10 and 12 each coupling device 24 again has at the free end of the relevant connector arm, e.g. 22a a coupling piece arranged thereon, on which both a plug-in pin 37 and a plug-in socket 38 are formed. The plug-in pin 37 has on its externally-facing surface a projection 69 in the form of a rib acting as an engagement member. A corresponding notching 70 in the form of a groove is situated on the internal surface of the coupling piece 56 adjoining the plug-in socket 38. In order to form the plug-in socket 38 so as to be slightly resilient, the coupling piece 56 is provided with longitudinal slits 71. On assembling two of the coupling devices described the projections 69 of the plug-in pins 37 of the two coupling devices engage automatically and simultaneously into the notches 70 of these coupling devices, whereby securing against unintential release of the coupling connection is achieved.

Figure 11:
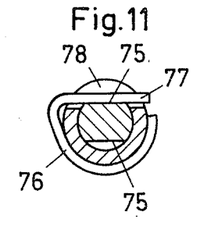
FIG. 11 is a cross-section along line XI—XI of FIG. 10.

FIGS. 10 and 11 show yet another embodiment of a rotationally mobile linkage between two different structural elements. As opposed to the example according to FIG. 2, one end of the coil spring 26 constituting the relevant connector arm, e.g. 22a, is non-rotatably fixed on a pin 72 of the central portion 21, e.g. by means of glueing. Into the opposite end of the coil spring 26 a sleeve piece 73 is firmly inserted, into which sleeve piece a pin-shaped extension 74 of the coupling piece 56 is rotatably inserted. The extension 74 has, in analogous manner to the connection pin 29 (FIG. 2), either one circumferential groove closed in itself, or two or more flats 75. Around the sleeve piece 73 a hoop 76 formed of spring wire is laid, which with a resilient arm 77 extends through a slit 78 of the sleeve piece and cooperates with the above-mentioned circumferential groove or the flats 75 of the pin-shaped extension 74. By means of the resilient arm 77 the coupling piece 56 is secured against axial movement in relation to the sleeve piece 73 and the connector arm 22a. A rotation of the coupling piece 56 relative to the sleeve piece 73 and the connector arm 22a is nevertheless made possible, whereby, when the case arises, the sprung arm 77, in conjunction with the flats 75 of the pin-shaped extension 74, provides for specific preferred rotational positions, as was explained in connection with FIGS. 3A and 3B.

Figure 13:
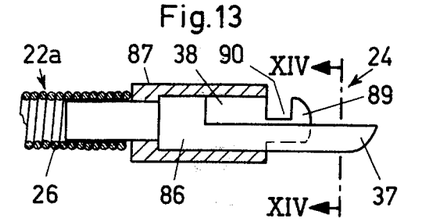
FIG. 13 shows another embodiment of connectable free end portion of an individual connector arm in cross-section.
Figure 14:
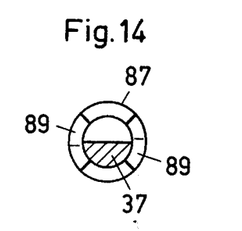
FIG. 14 is a cross-section along line XIV—XIV of FIG. 13.
Figure 15:
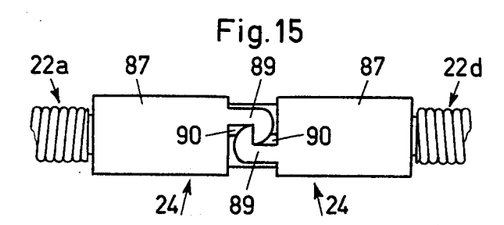
FIG. 15 shows the same end portion as FIG. 13 in side view and in coupling engagement with a similarly designed end portion of another connector arm.

In FIG. 13 to 15 a form of embodiment is shown in which each coupling device 24 has a coupling piece 86 fixedly arranged on the relevant connector arm, e.g. 22a, and which is surrounded by a rotatable sleeve 87. A plug-in pin 37 is formed on the coupling piece 86, while a plug-in socket is limited partly by the coupling piece 86 and partly by the sleeve 87. On the external free end of the sleeve 87 two hook-like projections 89 are provided, which in the first instance extend in the longitudinal direction of the sleeve and then in the circumferential direction thereof, in such a manner that between their hook-shaped bent away end portion and the end of sleeve 87 a notch 90 is formed in each case. The two projections 89 of the sleeve 87 are arranged diametrically opposed each to the other. The whole has substantially the shape of a bayonet union. On the assembling together of the coupling devices of two connector arms, e.g. 22a and 22b, each of the projections 89 of one coupling device is inserted between the projections 89 of the other coupling device, whereupon the sleeves of the two coupling devices are rotated in opposite directions in such a way that the bent away end portions of the projections 89 of the two coupling devices come into engagement with the notches 90 of the two coupling devices, as shown in FIG. 15. As a result the coupling connection is secured against undesirable release.

Figure 16:
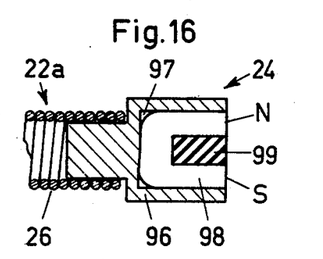
FIG. 16 shows another embodiment of the connectable end portion of a connector arm in longitudinal section.
Figure 17:
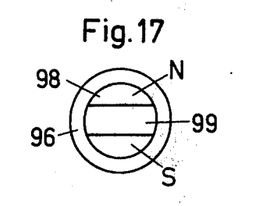
FIG. 17 is a view from the right-hand side in FIG. 16

Finally, in FIGS. 16 and 17 a further embodiment is shown in which the coupling device 24 has a coupling piece 97 with a central recess 97 fixed on the free end of the relevant connector arm, e.g. 22a. Into the recess of the coupling piece 96, which may consist e.g. of plastic, a substantially U-shaped permanent magnet 98 is inserted. The North and South poles areas N and S lie on the free end of the coupling piece 96. The gap between the two arms of the magnet 98 is appropriately filled with a plastic material 99. On the joining of two connector arms, the coupling devices of said arms are brought into contact together in such a manner that the North pole area N of one coupling device lies opposite the South pole area s of the other coupling device, and vice-versa. As a result of the mutual force of attraction of the magnets 98 the coupling devices are held together with sufficient force to prevent an unintentional separation of the coupled connector arms, even when said connector arms are resiliently bent.

It is naturally possible also to provide the coupling device according to FIGS. 16 and 17 additionally with means for positive securing against undesirable release, as was shown in the foregoing examples.

All embodiments herein described permit the co-axial coupling and uncoupling of the free ends of any two connector arms without the aid of additional means or tools.

I claim:

1. A set of structural elements for forming stereo-chemical models of molecular bonds between polyvalent atoms, each structural element having at least two connector arms representing the valences of at least one atom, each of said connector arms having opposite inner and outer end portions and being coupled at its inner end portion with a corresponding end portion of at least one other of the connector arms of the same structural element, the outer end of each connector arm comprising manually operable means for pairwise equiaxial coupling and uncoupling the arm to or from a corresponding outer end portion of another connector arm of the same structural element or of another one of the structural elements, wherein the means for pairwise coupling and uncoupling the outer end portions of the connector arms comprise identically designed coupling devices at each outer end portion of all connector arms, said coupling devices being configured for direct coupling of any two outer end portions of all connector arms without auxiliary means, the connector arms each comprising a flexible element which is normally rectilinear when unloaded.

2. A set according to claim 1, wherein each coupling device has a projecting coupling portion and a coupling recess, so that on coupling the outer end portions of two connector arms the projecting coupling portions of the respective arms are simultaneously brought into coupling engagement with the coupling recesses of the said two connector arms.

3. A set according to claim 2, wherein the projecting coupling portion is a pin and the coupling recess is a socket, and the longitudinal direction of the pin and of the socket extends parallel to the longitudinal axis of the outer end portion of the associated connector arm.

4. A set according to claim 3, wherein the cross sections of the pin and of the socket are of complementary shapes, and sizes, and together define a circular section.

5. A set according to claim 4, wherein the pin and the socket are each semi-circular in cross section, the pin being of solid semi-circular cross section with one diametral plane face and one convex face.

6. A set according to claim 1, wherein each coupling device includes at least one permanent magnet with the North and South poles thereof disposed at the free end of the connector arm for coupling together the outer end portions of two such connector arms, the North poles of the magnets of the outer end portions of two connector arms being disposed for contact with the the South poles of such magnets to effect coupling of said arms end-to-end, the magnet poles being identically disposed in each said coupling device for connecting of any coupling device with any other of the set.

7. A set according to claim 1, wherein said coupling devices comprise means for securing of the connection between coupled coupling devies, said securing means being all identical.

8. A set according to claim 7, wherein each coupling device has as its securing means at least one projection extending transverse to the longitudinal axis of the outer end portion of the associated arm, and at least one corresponding notch, the projection and the notch being such that on coupling the outer end portions of two connector arms, the projections of both coupling devices of said two arms engage the notches in these two coupling devices, simultaneously.

9. A set according to claim 8, wherein the projection and the notch of each coupling device are formed on a bayonet-type locking member.

10. A set according to claim 9, wherein the locking member comprises a sleeve rotatable with respect to the outer end portion of the associated connector arm.

11. A set according to claim 1, wherein at least one of said coupling devices is rotatable about the longitudinal axis of the outer end portion of the associated arm, through articulation means.

12. A set according to claim 11, wherein the articulation means includes means to produce a discontinuous manually surmountable resistance against rotation such as to provide at least one stable rest position with a predetermined angular relationship between the coupling device and the associated connector arm.

13. A set according to claim 11, wherein the inner end portion of at least one of the connector arms of at least one of the structural elements is connected to the other arms of the same element through articulation means allowing a rotating movement of said at least one connector arm about the longitudinal axis of said inner end portion.

14. A set according to claim 13, wherein the articulation means includes means to produce a discontinuous manually surmountable resistance against rotation such as to provide at least one stable rest position with a predetermined angular relationship between said at least one connector arm and the other arms of the same structural element.

15. A set according to claim 1, wherein a given connector arm includes at one of its ends an articulation means rotatably joining same to the adjacent one of the coupling device and remaining connector arms of the same structural element through the central portion of the latter, said articulation means including relatively rotatable and coaxially telescoped sleeve and pin members one of which is fixed at the connector arm end, said sleeve member having a transverse slot therein exposing a part of the pin member intermediate its ends, said pin member having a circumferential groove facing said slot, and a springy hoop member carried on said sleeve member and arm of said hoop member disposed in said slot and circumferential groove of said sleeve member and pin member respectively for axially retaining said pin member in said sleeve member.

16. A set according to claim 15, in which said circumferential groove is circumferentially discontinuous in depth and comprises at least a pair of circumferentially spaced substantially flat portions, each of which when opposed to the arm of the hoop member produces a manually surmountable resistance against rotation of the pin member in the sleeve member, the spacing of said flat portions circumferentially producing a discontinuous manually surmountable resistance against relative rotation providing stable rest positions with predetermined angular spaceings therebetween corresponding to the spacings of said flats on said pin member.

17. A set according to claim 1, in which each of said identical coupling devices has a pinlike base portion attached to the free end portion of the corresponding connector arm, the remainder of the coupling device extending axially outward from said pinlike portion and having two hemicircular cross section parts divided substantially by a diametral plane of the coupling device, one of said hemicircular parts being a hemicircular cross section plug-in pin and the other hemicircular cross section part being hemicircular cross section plug-in socket for receiving the corresponding hemicircular cross section plug-in pin of a coaxially aligned coupling device of another connector arm, said hemicircular plug-in pin being of solid cross section and having a diametral and substantially planar inner face and a substantially cylindrical outer face, such that the inner, substantially diametrally planar faces of plug-in pins of joining coupling devices have maximum face-to-face contact area.

18. A set according to claim 17, in which a diametrally extending rib and a diametrally extending notch are provided on the diametral face of the plug-in pin of said coupling device, such rib and notch being axially spaced from each other along said diametral face, and including means associated with said coupling device and connector arm and extending longitudinally beyond said pinlike portion of said coupling device in socket defining opposition to said plug-in pin for snugly receiving the corresponding plug-in pin of another coupling device, said notch being longitudinally inboard of said rib along said pinlike portion to provide an extra deterent to separation of two joined coupling devices.

19. A set according to claim 1, in which said coupling device includes a longitudinally inboard pinlike portion and a longitudinally outboard substantially diametrally divided portion having a solid substantially hemicircular cross section plug-in pin and a diametrally facing substantially hemicircular cross section plug-in socket area, said connector arm comprising a hollow spiral spring snugly receiving in its outer end, in coaxial telescoped relation, the pinlike inboard portion and a part of the plug-in pin of said coupling device, such that the end portion of said spring peripherally encloses said plug-in socket area along at least a part of its length, said plug-in pin having a transverse notch disposed beyond the end of the connector arm spring, the connector arm spring at the plug-in socket area having a winding portion somewhat offset from the rest of said spring for resilient locking engagement with the notch of a similar coupling device on another connector arm.

20. A set according to claim 17, in which said coupling device includes an integral substantially cylindrical shell circumferentially surrounding the inboard portion of said plug-in pin and plug-in socket and attached to said pinlike portion, means defining a transversely extending notch in the outer face of said shell adjacent said plug-in pin, and a springy member secured to said shell in diametral opposition to said notch and extending forward from said shell along the tipped portion of said plug-in pin to terminate in a radially inward extending engagement part, for locking engagement with the corresponding notch in a similar coupling device of another connector arm to be joined to the first-mentioned connector arm.

21. A set according to claim 17, in which the connector device includes a cylindrical shell portion surrounding the inboard end of said plug-in pin and of said plug-in socket, means defining substantially diametrally opposed slots extending longitudinaly inboard in said shell substantially to the depth of said plug-in socket and along the diametral face of said plug-in pin and including notch and recess means within the portion of the shell opposite the plug-in pin and on the radially outer face of said plug-in pin beyond said shell, said plug-in pin having a flush diametral face for maximum area contact with the plug-in pin of the coupling device of another connector arm.

* * * * *

UNITED STATES PATENT OFFICE
CERTIFICATE OF CORRECTION

Patent No. 4 020 566　　　　　　　　　Dated 77 May 3

Inventor(s) Andre Dreiding

It is certified that error appears in the above-identified patent and that said Letters Patent are hereby corrected as shown below:

Column 8, line 30; after "end" insert ---portion---.

Column 9, line 36; delete "11" and replace with ---1---.

Column 10, line 20; after "being" insert ---a---.

Signed and Sealed this twenty-sixth Day of July 1977

[SEAL]

*Attest:*

RUTH C. MASON
*Attesting Officer*

C. MARSHALL DANN
*Commissioner of Patents and Trademarks*